US008587794B2

(12) United States Patent
    Hosokawa

(10) Patent No.:     US 8,587,794 B2
(45) Date of Patent:     Nov. 19, 2013

(54) INFORMATION PROCESSING APPARATUS, CONTROL METHOD FOR THE SAME AND COMPUTER PROGRAM PRODUCT

(75) Inventor:  Takeshi Hosokawa, Shiojiri (JP)

(73) Assignee:  Seiko Epson Corporation, Tokyo (JP)

( * ) Notice:  Subject to any disclaimer, the term of this patent is extended or adjusted under 35 U.S.C. 154(b) by 456 days.

(21) Appl. No.:  12/952,324

(22) Filed:  Nov. 23, 2010

(65)     Prior Publication Data
    US 2011/0134454 A1     Jun. 9, 2011

(30)     Foreign Application Priority Data
    Dec. 7, 2009  (JP) ................................ 2009-277155

(51) Int. Cl.
    *G06F 3/12*     (2006.01)
(52) U.S. Cl.
    USPC ........................... 358/1.13; 358/448; 358/452
(58) Field of Classification Search
    USPC ........................ 358/1.1, 1.13, 448, 450, 452
    See application file for complete search history.

(56)     References Cited
    U.S. PATENT DOCUMENTS 6,134,016 A      10/2000  Watanabe et al.
    8,339,643 B2 *   12/2012  Watanabe ..................... 358/1.15
    2002/0093859 A1   7/2002  Kurashina
    2005/0002715 A1   1/2005  Fries et al.
    2006/0153618 A1   7/2006  Fries et al.

FOREIGN PATENT DOCUMENTS

JP      05-151215 A    6/1993
    JP      8-108577 A     4/1996
    TW      490396         6/2002
    TW      538373         6/2003

OTHER PUBLICATIONS

European Search Report, Oct. 5, 2012, issued in related Patent Application No. EP-10191636.

* cited by examiner

*Primary Examiner* — Thomas D Lee
(74) *Attorney, Agent, or Firm* — ALG Intellectual Property, LLC

(57)     ABSTRACT

An information processing apparatus which processes print information including inputted serial number information and arbitrary information includes: a serial number processing unit which carries out serial number processing to update the serial number information in ascending order or in descending order; a storage unit which stores the print information as a target of the serial number processing; an editing unit which carries out editing processing of the arbitrary information of the print information that is serial number-processed; a display unit which displays the print information that is inputted and edited; and a display control unit which compares at least two or more pieces of the print information that is stored, and displays the print information from which a different part of the arbitrary information is erased, at the time of displaying the print information after the serial number processing is executed twice or more for the editing processing.

13 Claims, 4 Drawing Sheets

INFORMATION PROCESSING APPARATUS, CONTROL METHOD FOR THE SAME AND COMPUTER PROGRAM PRODUCT

CROSS-REFERENCE

The present application claims priority from Japanese Patent Application No. 2009-277155 filed on Dec. 7, 2009, which is hereby incorporated by reference in its entirety.

BACKGROUND

In the related art, a printing apparatus (tape printing apparatus) having a so-called "serial number function (or numbering processing function)" is known in which in the case of producing plural sheets of printed matter which are different only in particular numbers or alphabetical letters having ordinality are different, the particular number or alphabetical letter is incremented (or decremented) every time a sheet of printed matter is printed (see, for example, Japanese Patent Publication No. 8-108577). Using this printing apparatus, it is possible to produce printed matter containing a predetermined letter string (or letters) to which numbers incremented one by one are appended, for example, "Room 1", "Room 2", "Room 3" and the like, or printed matter containing a predetermined letter string to which alphabetical letters appended in alphabetical order, such as "Class A", "Class B", "Class C" and the like.

However, in the case of producing plural sheets of printed matter, it may be intended in some cases that plural sheets of printed matter on which only a part of print contents other than numbers or alphabetical letters having ordinality is different, as well as producing plural sheets of printed matter on which numbers or alphabetical letters having ordinality are incremented (or decremented) and only this part is different as described above. For example, such cases include the case of intending to produce plural sheets of printed matter having a different letter string as a part of print contents, or the like. In this case, with the printing apparatus, a user must repeat the operation of erasing (deleting) a letter string to be changed, of previously inputted print contents, and newly inputting a desired letter string. Therefore, there is a problem that the operation takes time and effort.

SUMMARY

Various embodiments may provide an information processing apparatus that can easily produce plural sheets of printed matter on which a part of print contents other than numbers or alphabetical letters having ordinality is updated with the update of the numbers or alphabetical letters having ordinality, and a control method for the apparatus can be provided.

According to at least one embodiment of the disclosure, an information processing apparatus processes print information including inputted serial number information and arbitrary information. The apparatus includes: a serial number processing unit which carries out serial number processing to update the serial number information in ascending order or in descending order; a storage unit which stores the print information as a target of the serial number processing; an editing unit which carries out editing processing of the arbitrary information of the print information that is serial number-processed; a display unit which displays the print information that is inputted and edited; and a display control unit which compares at least two or more pieces of the print information that is stored in the storage unit, and displays the print information from which a part of the arbitrary information being determined to be different in the comparison of the at least two or more pieces of the print information is erased, at the time of displaying the print information after the serial number processing is executed twice or more for the editing processing.

According to at least one embodiment of the disclosure, a control method for an information processing apparatus which processes print information including inputted serial number information and arbitrary information includes: carrying out serial number processing to update the serial number information in ascending order or in descending order; storing the print information as a target of the serial number processing; carrying out editing processing of the arbitrary information of the print information that is serial number-processed; and comparing at least two or more pieces of the print information that is stored, and displaying on a display unit the print information from which a different part of the arbitrary information is erased, at the time of displaying the print information after the serial number processing is executed twice or more for the editing processing.

With such configurations, at the time of displaying print information after serial number processing is carried out twice or more, plural pieces of print information that are targets of serial number of processing in the past are compared and the print information is displayed from which different parts of arbitrary information of these plural pieces of print information are erased. Thus, in the case of producing plural sheets of printed matter on which not only serial number information but also a part of print contents (arbitrary information) other than the serial number information is different, the user can omit the effort of manually erasing the part to be updated each time, as in the traditional technique, in order to edit the contents. Therefore, the plural sheets of printed matter can be easily produced.

For example, in school, at the time of producing printed matter on which the school name, school year, class, student number (number to identify the individual student) and student name are printed for each student belonging to a certain class, the student number is updated by serial number processing. In the case of displaying print information of the third and subsequent sheets, the print information can be displayed from which the part of the student name is erased. Therefore, the part of the student name can be edited easily and quickly.

It is preferable that the information processing apparatus according to the aspect of the invention further includes a printing unit which carries out printing on a recording medium on the basis of the print information.

With this configuration, plural sheets of printed matter on which not only serial number information but also a part of print contents other than the serial number information is different can be easily printed. For example, when a tape-like member is used as a recording medium, the apparatus is used as a tape printing apparatus and is convenient for producing plural labels on which a part of print contents is different.

It is also preferable that in the information processing apparatus, the storage unit stores the print information as a target of two rounds of serial number processing in the past, in a series of serial number processing.

It is also preferable that in the information processing apparatus, the storage unit stores the print information as a target of two rounds of serial number processing in the most recent past, in a series of serial number processing.

It is also preferable that in the information processing apparatus, the storage unit stores the print information as a target of the serial number processing that was executed first and the print information as a target of the serial number processing that was executed last, in a series of serial number processing.

With these configurations, at the time of displaying print information, simply by storing print information as a comparison target of the past two rounds, it is possible to reduce the storage capacity (storage area) to be used, compared with the case of accumulating and saving all the past print information. Thus, the cost of the memory or the like can be reduced.

Since a different part of arbitrary information is specified by the comparison of print information of the past two rounds, processing related to the comparison of the print information can be simplified and the time required for the comparison can be reduced, for example, compared with the case of comparing all the past print information.

As the print information of the past two rounds that is stored, for example, print information as a target of two rounds of serial number processing in the most recent past (that is, print information as a target of the serial number processing that is executed last or print information as a target of serial number processing that is executed prior to the last serial number processing), or print information as a target of the first and last executed serial number processing may be considered.

It is also preferable that the information processing apparatus further includes a number of print sheets setting unit which sets the number of print sheets for the print information as a print target when printing is designated to the printing unit.

With this configuration, the user can set the number of print sheets when printing is designated, that is, immediately before actual printing. Therefore, printed matter of the number of sheets desired by the user can be printed securely. For example, in the case of setting the number of print sheets in advance before designating printing, a situation may occur that printed matter of the number of sheets that is not intended by the user is printed because of failure to set the number of sheets or a setting error (for example, when the number of sheets that is previously set is left unchanged). However, this situation can be prevented according to the aspects of the invention.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EMBODIMENTS

Hereinafter, an embodiment of the invention will be described in detail with reference to the attached drawings. In this embodiment, a tape printing apparatus which carries our printing on a tape-like member (recording medium) and thus produces labels (printed matter) is described as an example of the information processing apparatus.

Figure 1:
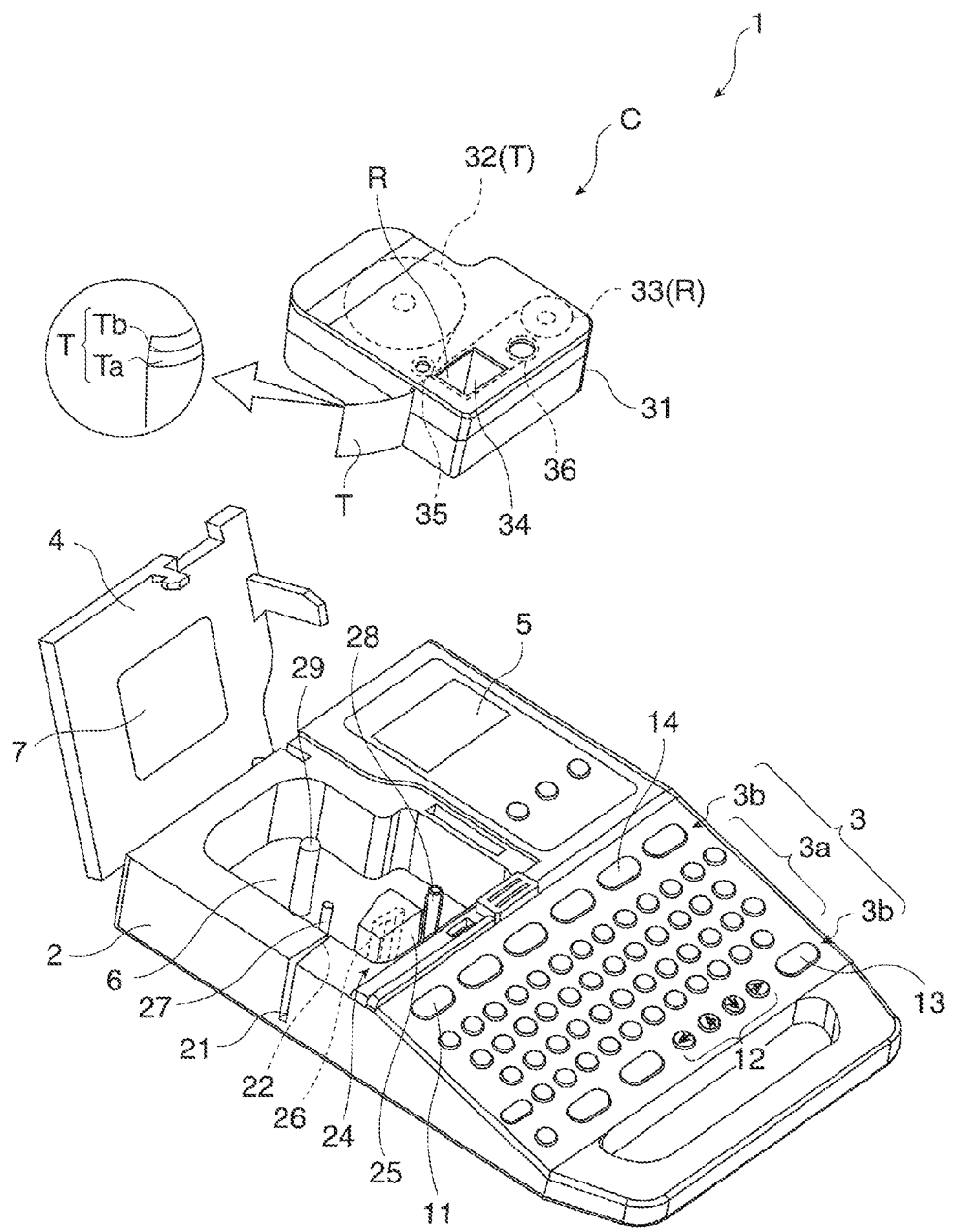
FIG. 1 is an outer perspective view showing a tape printing apparatus with its cover open according to an embodiment of the invention.

FIG. 1 is an outer perspective view showing a tape printing apparatus 1 with an open/close cover 4 opened according to this embodiment. As shown in FIG. 1, an armor of the tape printing apparatus 1 is formed by an apparatus case 2. A keyboard 3 (editing unit) having various input keys is arranged on the top front side of the apparatus case 2. On the top rear side, the open/close cover 4 is attached to the left part and a display screen 5 (display unit) is provided to the right. Inside the open/close cover 4, a cartridge loading section 6 for loading a tape cartridge C therein is formed in the shape of a recess. The tape cartridge C is removably loaded in the cartridge loading section 6 in the state where the open/close cover 4 is opened. Also, a viewing window 7 is formed which enables visual recognition of the loading or non-loading of the tape cartridge C in the state where the open/close cover 4 is closed.

On the keyboard 3, a letter key group 3a, and a function key group 3b to designate various operation modes are arranged. The letter key group 3a is similar to the keys on a general word processor as the letter key group 3a has a full key configuration based on the JIS arrangement and includes a shift key for restraining increase in the number of keys to be operated. The function key group 3b includes a "print" key 11, cursor keys 12, a "select" key 13, a "serial number" key 14 and the like. For these key inputs, an individual key may be provided for each key input or a smaller number of keys combined with a shift key or the like may be used for the input, as in a general keyboard.

The "print" key 11 is a key for designating the execution of print. The cursor keys 12 include up, down, left and right keys ("↑", "↓", "←", "→") and these keys are for moving the cursor or performing scroll operations. The "select" key 13 is a key for selecting and finalizing a selection candidate (option). The "serial number" key 14 is a key for inputting an initial value of number or alphabetical letter as a target of serial number processing (hereinafter, the inputted number or alphabetical letter is referred to as "serial number information" as a whole). The serial number processing refers to the processing to update the part of the number or alphabetical letter in a text inputted by the user operating the "serial number" key 14, in ascending order (or descending order) every time one label L (see FIG. 4A) is printed. The text in this case includes characters such as letters (letter string), numbers, alphabetical letters, symbols, and simple patterns.

The display screen 5 is formed of a liquid crystal display. The display screen 5 is used by the user for inputting a desired text or image via the keyboard 3, then creating and editing print data such as text data or image data, and visually recognizing (confirming) the result.

A tape discharge port 21 connecting the cartridge loading section 6 to the outside of the apparatus case 2 is formed at a left-side part of the apparatus case 2. In the tape discharge port 21, a tape cutter 22 (full cutter 52 and half cutter 54; see FIG. 2) is provided for cutting a print tape T that is displaced outwards through the tape discharge port 21. The printed print tape T can be displaced outwards by a predetermined length from the tape discharge port 21. In the state where the displacement of the tape is temporarily stopped, the printed print tape T is cut by the tape cutter 22. Thus, a stripe-like label L is created.

In the cartridge loading section 6, a head unit 24 having a thermal print head 26 built in a head cover 25, a platen drive shaft 27 facing the print head 26, a reel-in drive shaft 28 which reels in an ink ribbon R, which will be described later, and a positioning protrusion 29 for a tape reel 32, which will be described later, are provided. Below the cartridge loading section 6, a tape feeding motor 30 (see FIG. 2) which rotates the platen drive shaft 27 and the reel-in drive shaft 28 is built in.

The tape cartridge C houses a tape reel 32 on which the print tape T with a predetermined width (approximately 4 to 48 mm) is wound, at a top central part within a cartridge case 31, and a ribbon reel 33 on which the ink ribbon R is wound, at a bottom right part. The print tape T and the ink ribbon R have the same width. A through-hole 34 for the head unit 24 to be inserted in is formed at a left part below the tape reel 32. A platen roller 35 which is engaged with the platen drive shaft 27 to rotate-drive is arranged at a position that faces the print head 26 built in the head unit 24, across the overlapping part of the print tape T and the ink ribbon R, in the state where the head unit 24 is inserted in the through-hole 34. Meanwhile, a ribbon reel-in reel 36 is arranged closely to the ribbon reel 33. The ink ribbon R reeled off from the ribbon reel 33 is arranged to surround the head cover 25 and becomes reeled in by the ribbon reel-in reel 36.

When the tape cartridge C is loaded in the cartridge loading section 6, the head cover 25 is inserted in the through-hole 34, the position protrusion 29 is inserted in the center hole of the tape reel 32, and the reel-in drive shaft 28 is inserted in the center hole of the ribbon reel-in reel 36. The print head 26 is abutted against the platen roller 35, with the print tape T and the ink ribbon R nipped between the print head 26 and the platen roller 35. Thus, printing becomes available. After that, as the user inputs a desired text or image via the keyboard 3 while confirming the result of editing on the display screen 5 and then designates printing, the tape printing apparatus 1 reels off the print tape T from the tape cartridge C by the tape feeding motor 30 and causes a heat generating element of the print head 26 to selectively generate heat, thus performing desired printing on the print tape T. The printed part of the print tape T is displaced outwards, as required, from the tape discharge port 21. When the printing is completed, the tape feeding motor 30 feeds the print tape T to a position where a tape length including a margin is obtained. After that, the tape feeding motor 30 stops the feeding (and then the apparatus shifts to cutting processing).

Meanwhile, the print tape T includes a recording tape Ta having an adhesive layer formed on its back side, and a separation tape Tb pasted to the recording tape Ta by the adhesive layer. The print tape T is wound in the shape of a roll with the recording tape Ta facing outside and the separation tape Tb facing inside, and is housed in the cartridge case 31. Different types of print tapes T (with different tape width, tape background colors, background patterns, materials (textures) and the like) are prepared. One of these types of print tapes T or ink ribbons R is housed in each cartridge case 31. On the back side of the cartridge case 31, plural holes (not shown) to specify the type of the tape cartridge C are provided. In the cartridge loading section 6, plural tape identification sensors (micro-switches or the like) 37 (see FIG. 2) are provided corresponding to the plural holes. As the tape identification sensors 37 detect the state of the plural holes, the tape type can be determined.

Figure 2:
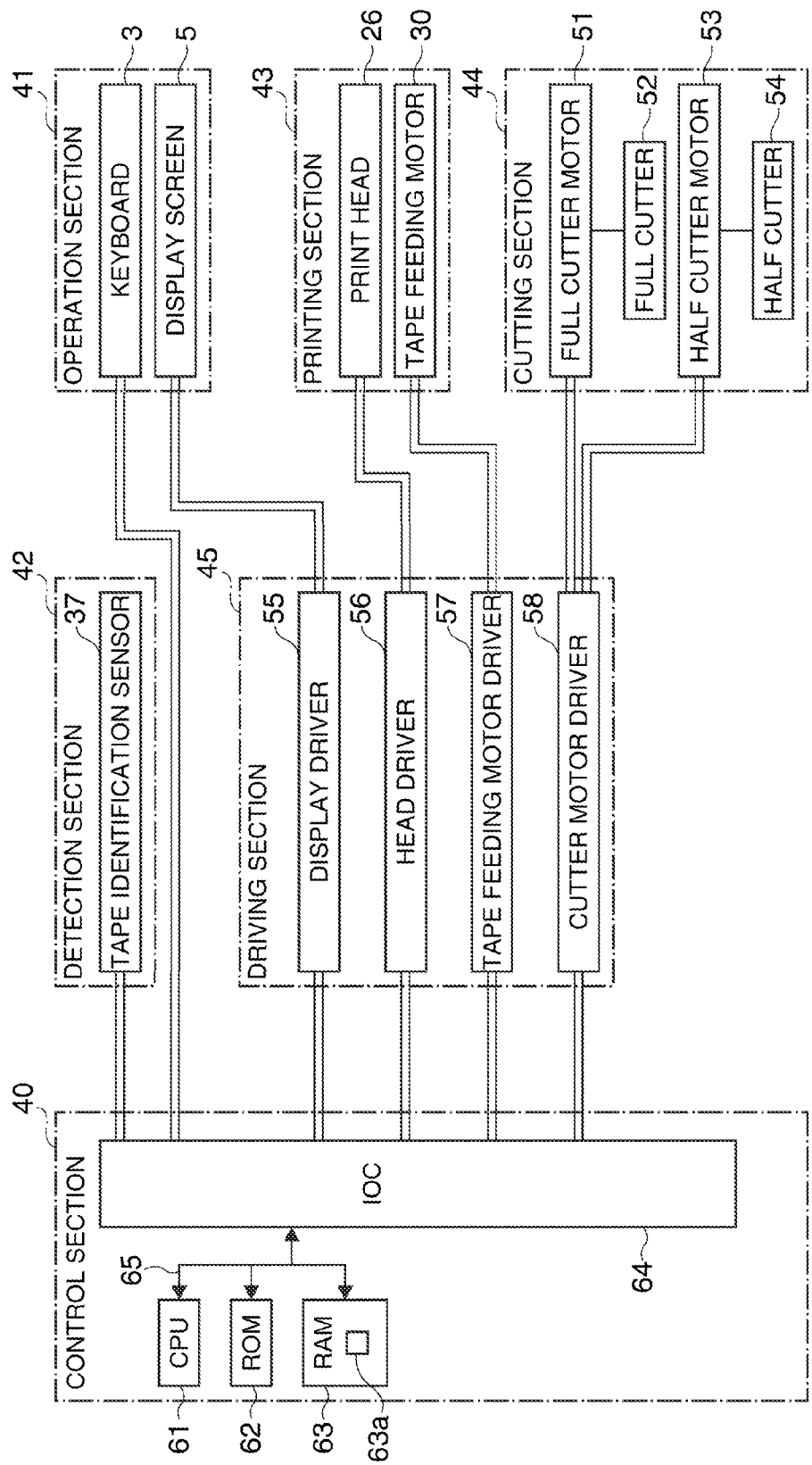
FIG. 2 is a control block diagram of the tape printing apparatus.

Next, the control configuration of the tape printing apparatus 1 will be described with reference to the control block diagram of FIG. 2. The tape printing apparatus 1 has an operation section 41, a detection section 42, a printing section 43 (printing unit), a cutting section 44, a driving section 45, and a control section 40 which is connected to these sections and controls the entire tape printing apparatus 1.

The operation section 41 functions as a user interface for input and editing of information and setting via the letter key group 3a and the function key group 3b on the keyboard, display of these various kinds of information on the display screen 5, and so on. The display control unit described in the appended claims includes the control section 40 and the display screen 5 as its principal components.

The detection section 42 has the above-described tape identification sensor 37 and detects the type of the print tape T (tape cartridge C). The printing section 43 has the print head 26 and the tape feeding motor 30 and performs printing based on generated print data, on the print tape T, while feeding the print tape T and the ink ribbon R.

The cutting section 44 has a full cutter 52 which cuts both the recording tape Ta and the separation tape Tb of the print tape T, a full cutter motor 51 which drives the full cutter 52, a half cutter 54 which cuts only the recording tape Ta of the print tape T, and a half cutter motor 53 which drives the half cutter 54. The print tape T that is already print-processed in the printing section 43 is cut to a predetermined length by the full cutter 52 and the half cutter 54, and a label L is thus created. The driving section 45 has a display driver 55, a head driver 56, a tape feeding motor driver 57, and a cutter motor driver 58, and drives each section.

The control section 40 has a CPU (Central Processing Unit) 61, a ROM (Read Only Memory) 62, a RAM (Random Access Memory) 63, and an input output controller (hereinafter referred to as "IOC") 64. These parts are connected with each other by an internal bus 65. The ROM 62 stores control programs and control data for the CPU 61 to control various kinds of processing including print processing.

The RAM 63 is used as a work area for the CPU 61 to execute various kinds of processing. The RAM 63 has a print information storage area 63a (storage unit). In the print information storage area 63a, print information as a target of serial number processing that is carried out after print processing (serial number information, and information made up of a text other than the serial number information (hereinafter referred to as "arbitrary text or arbitrary information")) is stored. In other words, print information (print content) printed on the label L by print processing is stored.

With the above configuration, the CPU 61 inputs various signals and data from each section in the tape printing apparatus 1 via the IOC 64 in accordance with various control programs in the ROM 62. As various data in the RAM 63 is processed on the basis of the inputted various signals and data and various signals and data are outputted to each section of the tape printing apparatus 1 via the IOC 64, input editing processing and print cutting processing are controlled.

By carrying out the above serial number processing, it is possible to easily create plural labels L on which only serial number information is different. However, in some cases, it is demanded that plural labels L on which a part of the text other than the serial number information is different as well as the serial number information, should be created. In such cases, traditionally there is a problem that the user needs to repeat an operation to erase the text part as a target of change and then input a new text, which takes time and effort. To overcome this problem, the tape printing apparatus 1 according to the embodiment of the invention has the function of automatically erasing a part of an arbitrary text of print information when displaying the print information after serial number processing is executed twice or more. Hereinafter, this operation will be described in detail with reference to FIG. 3, FIG. 4A and FIG. 4B.

Figure 3:
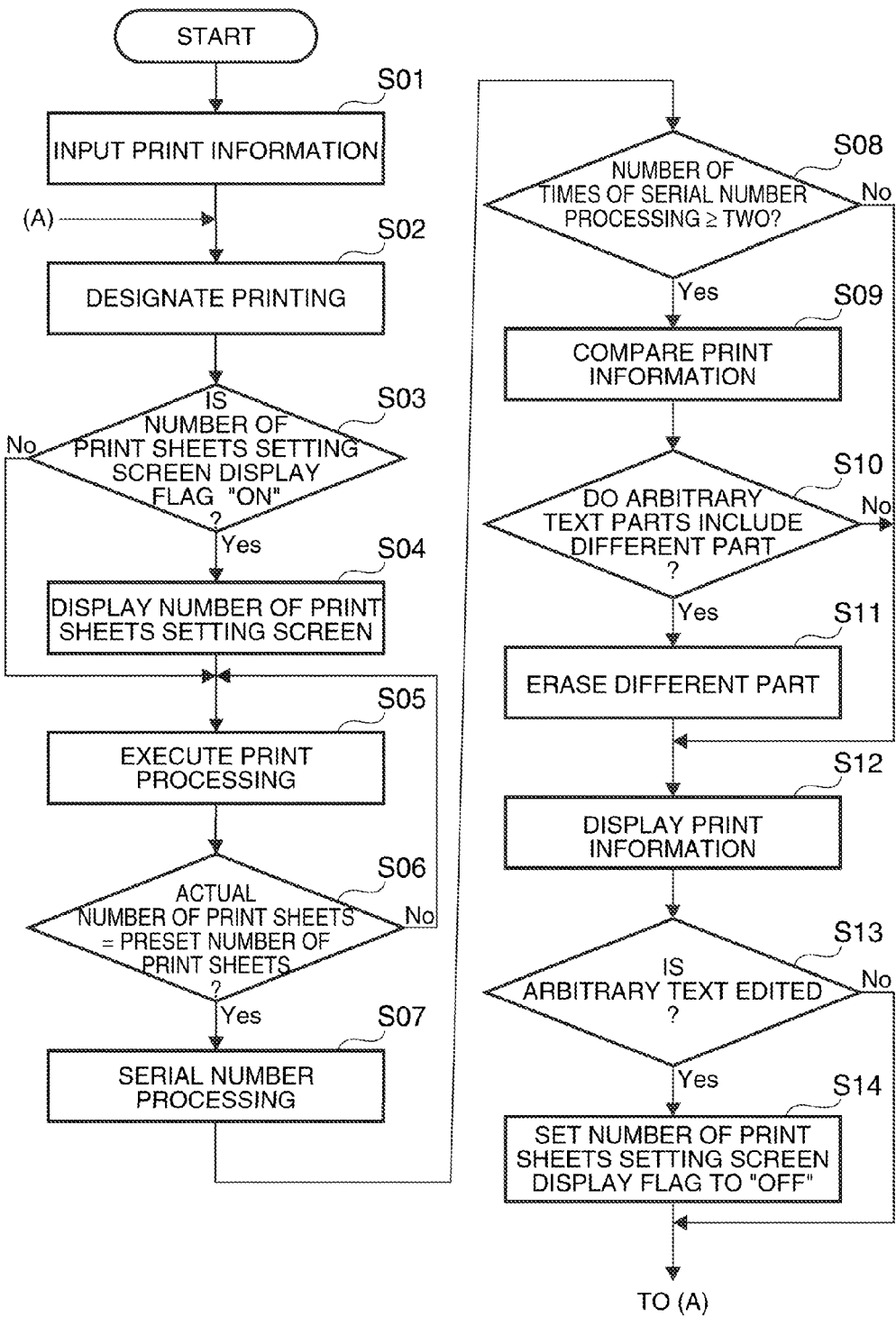
FIG. 3 is a flowchart for explaining the operation procedure in the tape printing apparatus in the case of producing plural labels having partly different print contents.

FIG. 3 is a flowchart for explaining the operation procedure in the tape printing apparatus 1 in the case of creating plural labels L on which a part of an arbitrary text is different as well as serial number information. First, print information including an arbitrary text and serial number information is inputted by the user (S01). When printing is designated by a press of the "print" key 11 (S02), the CPU 61 (tape printing apparatus 1) determines whether or not to display a screen (hereinafter, a number of print sheets setting screen) to set the number of print sheets for labels L having the same contents (where all the arbitrary texts and serial number information are the same). This determination is made depending on the state of a number of print sheets setting screen display flag (that is, whether this flag is "ON (default setting)" or "OFF").

If the number of print sheets setting screen display flag is "ON" (Yes in S03), the CPU 61 displays a number of print sheets setting screen (S04, number of print sheets setting unit). When a desired number of print sheets is set (selected) by the user on the number of print sheets setting screen, the CPU 61 executes print processing of the labels L based on the print information (S05). On the other hand, if the number of print sheets setting screen display flag is "OFF" (No in S03), the CPU 61 executes print processing without displaying the number of print sheets setting screen (S05). In the print processing in S05, the CPU 61 counts the number of times the print processing is executed, that is, the number of print sheets of the labels L that are actually printed.

Next, the CPU 61 determines whether the number of print sheets of the labels L that are actually printed amounts to the preset number of print sheets or not. If the actual number of print sheets is less than the preset number of print sheets (No in S06), the CPU 61 repeats the execution of the processing of S05 and the subsequent processing until the actually number of print sheets reaches the preset number of print sheets. When the actual number of print sheets amounts to the preset number of print sheets (Yes in S06), the CPU 61 executes serial number processing to the print information (S07, serial number processing unit).

In this serial number processing, the CPU 61 first stores the print information as a target of the serial number processing (print information that is print-processed) in the print information storage area 63a. And then, the CPU 61 executes the serial number processing to produce print information that updates the serial number information only. In this embodiment, the print information as a target of two rounds of serial number processing in the most recent past is stored. That is, when the serial number processing is executed once, the print information as a target of the first round of the serial number processing is stored. When the serial number processing is executed twice, the print information as a target of the first round of the serial number processing and the print information as a target of the second round of the serial number processing are stored. Moreover, when the serial number processing is executed three times, the print information as a target of the second round of the serial number processing and the print information as a target of the third round of the serial number processing are stored.

Next, after the serial number processing, the CPU 61 determines whether the number of times the serial number processing is actually executed so far is two or greater. If the number of times the serial number processing is actually executed so far is less than two (once), (No in S08), the CPU 61 displays the print information in which only the serial number information is updated by the serial number processing of S07, on the display screen 5 (text input screen) (S12). In this state, if the arbitrary text of the print information is edited by the user (Yes in S13), the CPU 61 sets the number of print sheets setting screen display flag to "OFF" (S14). After that, when printing is designated by the user, the CPU 61 executes the processing of S02 and the subsequent processing. On the other hand, in the state of S12, if the arbitrary text of the print information is not edited by the user (No in S13) and printing is designated by the user, the CPU 61 executes the processing of S02 and the subsequent processing without changing the number of print sheets setting screen display flag.

Meanwhile, if the number of times the serial number processing is actually executed so far is two or greater (Yes in S08), the CPU 61 compares the two pieces of print information stored in the print information storage area 63a (print information as a target of two rounds of serial number processing in the most recent past) (S09). If the arbitrary text parts of the print information (other parts than the serial number information) are the same as a result of the comparison (No in S10), the CPU 61 displays the print information in which only the serial number information is updated by the serial number processing of S07, on the display screen 5 (S12). After that, the CPU 61 executes the processing of S13 and the subsequent processing based on the user's operation (designation).

On the other hand, if the arbitrary text parts of the print information (other parts than the serial number information) are different as a result of the comparison (Yes in S10), the CPU 61 erases a text (character(s)) equivalent to the parts that are found to be different as the result of the comparison, in the arbitrary text part of the print information with its serial number information updated by the serial number processing of S07, and then displays the resulting print information on the display screen 5 (S12). After that, the CPU 61 executes the processing of S13 and the subsequent processing based on the user's operation (designation).

In the above processing of S08, the number of times of serial number processing as a comparison reference is two. However, the number of times of serial number processing is not limited to this example. For example, the number of times of serial number processing as a comparison reference may be set in advance. In this case, if the number of times the serial number processing is actually executed is less than the preset number of times of serial number processing, the processing after No in S08 is executed. If the number of times the serial number processing is actually executed is equal to or greater than the designated number of times of serial number processing, the processing after Yes in S08 is executed.

Figure 4A:
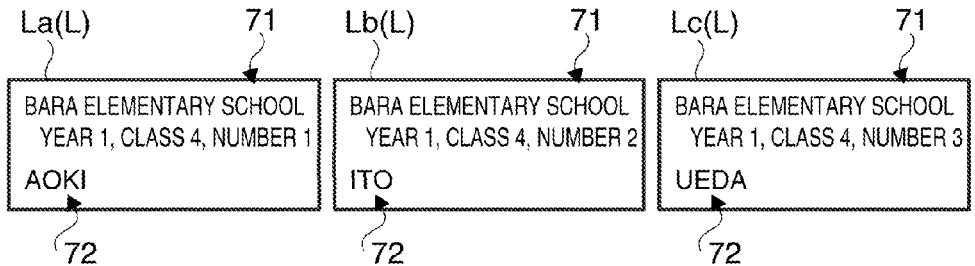
FIG. 4A shows three labels having partly different print contents.
Figure 4B:
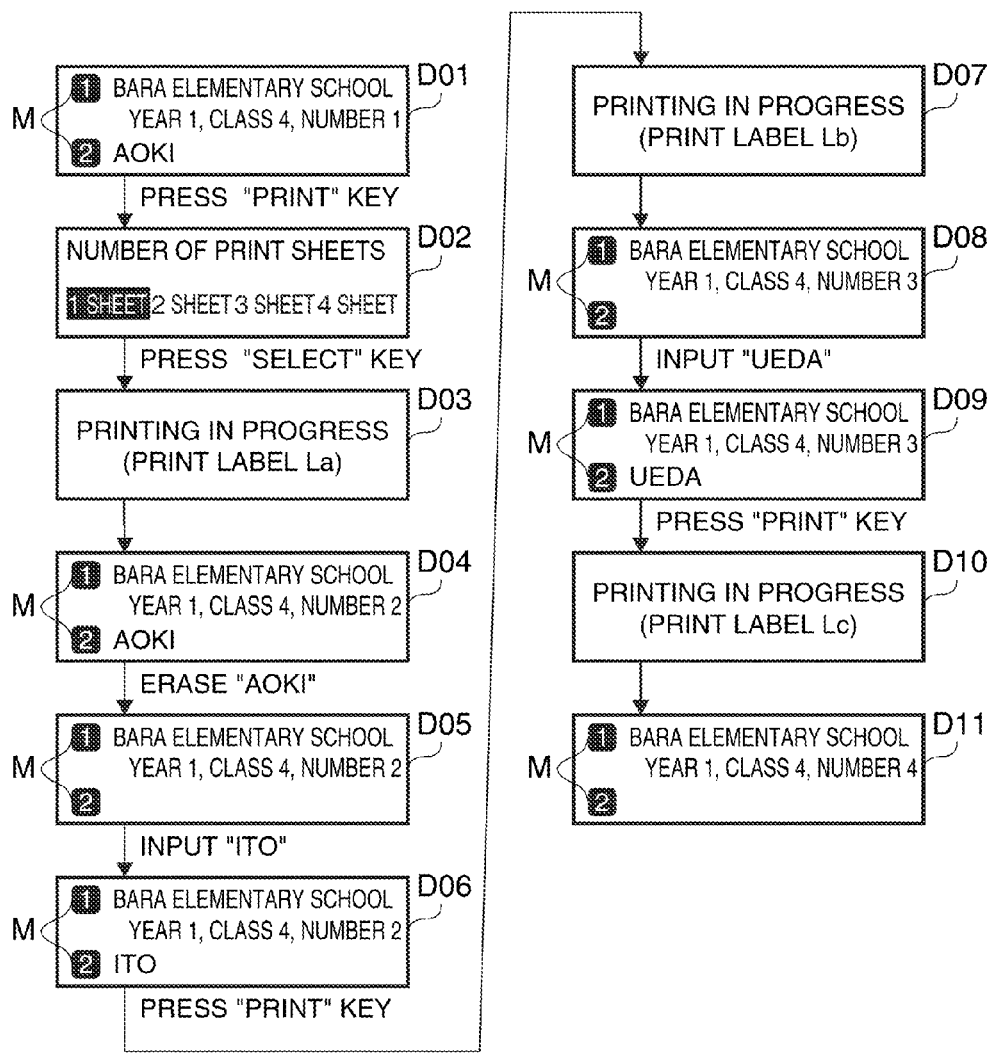
FIG. 4B shows transition of screens in the tape printing apparatus in the case of producing these labels.

Here, to facilitate understanding, the procedure in the case of creating three labels L having partly different print contents by the tape printing apparatus 1 according to the embodiment of the invention will be described in detail with reference to FIG. 4A and FIG. 4B. FIG. 4A shows an example of labels L to be created. FIG. 4A shows three labels L (La to Lc) having a part 71 of "student number (number to identify each individual student)" and a part 72 of "student name" that are different from each other. FIG. 4B illustrates transition of screens in the case of creating the three labels L (La to Lc) shown in FIG. 4A. Hereinafter, the procedure will be described with reference to the screen transition of FIG. 4B. Reference numbers M in FIG. 4B are line head marks indicating which line an inputted text is located on.

First, a screen D01 shows the text input screen in the state where "Bara Elementary School Year 1, Class 4, Number 1" is inputted by the user as "school name", "school year", "class" and "student number" on the first line, and "Aoki" is inputted as "student name" on the second line (S01 in the flowchart of FIG. 3). Here, "1" (shaded) inputted as "student number" is the initial value of the serial number information inputted on the screen displayed by a press of the "serial number" key 14.

Next, when the "print" key 11 is pressed by the user in this state (D01), the screen shifts to the number of print sheets setting screen to select the number of print sheets of labels L having the same contents (D02). Here, since the number of print sheets setting screen display flag is "ON" (default setting), the processing is executed according to the procedures of S02, Yes in S03 and S04 in the flowchart of FIG. 3.

Here, when the "select" key 13 is pressed in the state where "1 sheet" is selected by the user (highlighted), "1 sheet" is finalized as the number of print sheets and the screen shifts to the print execution screen (D03). The label L having the display content of D01, that is, the label La shown in FIG. 4A is printed (S05 in the flowchart of FIG. 3). After the printing is finished, the text input screen is displayed where "student number" is updated to "2" by serial number processing (D04). Here, since print processing of the label L in the preset number of sheets (1 sheet) is completed and the first serial number processing (first round of serial number processing) is executed, the processing is executed according to the procedures of Yes in S06, S07, No in S08, and S12 in the flowchart of FIG. 3.

When, in this state (D04), "Aoki" is erased and "Ito" is inputted by the user (D05 and D06) and then the "print" key 11 is pressed, the screen shifts to the print execution screen and the label L having the display content of D06, that is, the label Lb shown in FIG. 4A is printed (D07). Here, since printing is designated after "student name" (arbitrary text part) is edited by the user, the number of print sheets setting screen display flag is "OFF" and print processing is executed without displaying the number of print sheets setting screen. That is, the processing is executed according to the procedures of Yes in S13, S14, S02, No in S03, and S05 in the flowchart of FIG. 3.

After printing is finished, the text input screen is displayed where "student number" is updated to "3" by serial number processing and "student name (Ito)" is erased (D08). That is, at the time of displaying the screen D08, the print information as a target of the first round of serial number processing (content of the first-sheet label La) and the print information as a target of the second round of serial number processing (content of the second-sheet label Lb) are stored in the print information storage area 63a, and as a result of comparing these two pieces of print information, "Aoki" and "Ito" are determined as different parts. Therefore, in the screen D08, "Ito", which would originally be displayed, is erased. That is, the processing is carried out according to the procedures of Yes in S06, S07, Yes in S08, S09, Yes in S10, S11, and S12 in the flowchart of FIG. 3.

Next, when, in this state (D08), "Ueda" is inputted by the user (D09) and then the "print" key 11 is pressed, the screen shifts to the print execution screen and the label L having the display content of D09, that is, the label Lc shown in FIG. 4A is printed (D10). That is, the processing is carried out according to the procedures of Yes in S13, S14, S02, No in S03, and S05 in the flowchart of FIG. 3.

After printing is finished, the text input screen is displayed where "student number" is updated to "4" by serial number processing and "student name (Ueda)" is erased (D11). That is, at the time of displaying the screen D11, the print information as a target of the second round of serial number processing (content of the second-sheet label Lb) and the print information as a target of the third round of serial number processing (content of the third-sheet label Lc) are stored in the print information storage area 63a, and as a result of comparing these two pieces of print information, "Ito" and "Ueda" are determined as different parts. Therefore, in the screen D11, "Ueda", which would originally be displayed, is erased. That is, the processing is carried out according to the procedures of Yes in S06, S07, Yes in S08, S09, Yes in S10, S11, and S12 in the flowchart of FIG. 3.

As described above, according to the embodiment, at the time of displaying print information after serial number processing is carried out twice or more, plural pieces of print information as targets of serial number processing in the past are compared and the print information is displayed from which a different part of the arbitrary text (arbitrary information) of the print information is erased. Thus, in the case of creating plural labels L on which a part of a text other than serial number information is different as well as the serial number information, the user can consequently create (print) plural labels L easily and efficiently.

For example, in school, at the time of creating labels L (for example, labels La to Lc shown in FIG. 4A, or the like) on which the school name, school year, class, student number (number to identify the individual student) and student name are printed for each student belonging to a certain class, the student number is updated by serial number processing. In the case of displaying print information of the third and subsequent sheets, the print information can be displayed from which the part of the student name is erased. Therefore, the part of the student name can be edited easily and quickly, which is convenient.

Also, as in the embodiment, at the time of displaying print information, simply by storing print information as a comparison target of the past two rounds, it is possible to reduce the storage capacity (storage area) to be used, compared with the case of accumulating and saving all the past print information. Thus, the cost of the memory or the like can be reduced. Moreover, since a different part of an arbitrary text is specified by the comparison of the print information of the past two rounds, processing related to the comparison of the print information can be simplified and the time required for the comparison can be reduced, for example, compared with the case of comparing all the past print information.

Also, as in the embodiment, since the user can set the number of print sheets when printing is designated, that is, immediately before actual printing, labels L of the number of sheets desired by the user can be printed securely. For example, in the case of setting the number of print sheets in advance before designating printing, a situation may occur that labels L of the number of sheets that is not intended by the user are printed because of failure to set the number of sheets or a setting error (for example, when the number of sheets that is previously set is left unchanged). However, this situation can be prevented according to the invention.

In the embodiment, as the print information stored in the print information storage area 63a, print information as a target of two rounds of serial number processing in the most recent past is stored. However, the print information to be stored is not limited to this example. For example, in a series of label creation processing, print information as a target of the serial number processing that is executed first and print information as a target of the serial number processing that is executed last may be stored. That is, when the serial number processing is executed once, the print information as a target of the first round of the serial number processing may be stored. When the serial number processing is executed twice, the print information as a target of the first round of the serial number processing and the print information as a target of the second round of the serial number processing may be stored. When the serial number processing is executed three times, the print information as a target of the first round of the serial number processing and the print information as a target of the third round of the serial number processing may be stored.

In the embodiment, the print information as a target of past two rounds of the serial number processing is stored and a different part of the arbitrary text is specified by the comparison of these two pieces of print information. However, the specification of a different part is not limited to this example. For example, all the print information as a target of the past serial number processing may be stored and a different part of the arbitrary text may be specified by the comparison of all the print information.

In the embodiment, the tape printing apparatus 1 is described as an example of the information processing apparatus. However, the information processing apparatus is not limited to this example. For example, various kinds of processing (input and editing of print information, processing related to display, serial number processing and the like) of the tape printing apparatus 1 according to the embodiment may be realized with a personal computer or the like.

The configuration of and processing processes in the tape printing apparatus 1 are not limited to the above embodiment and various changes can be properly made without departing from the scope of the invention.

What is claimed is:

1. An information processing apparatus which processes print information including inputted serial number information and arbitrary information, the apparatus comprising:
    a serial number processing unit which carries out serial number processing to update the serial number information in ascending order or in descending order;
    a storage unit which stores the print information as a target of the serial number processing;
    an editing unit which carries out editing processing of the arbitrary information of the print information that is serial number-processed;
    a display unit which displays the print information that is inputted and edited; and
    a display control unit which compares at least two or more pieces of the print information that is stored in the storage unit, and displays the print information from which a part of the arbitrary information being determined to be different in the comparison of the at least two or more pieces of the print information is erased, at the time of displaying the print information after the serial number processing is executed twice or more for the editing processing.

2. The information processing apparatus according to claim 1, further comprising a printing unit which carries out printing on a recording medium on the basis of the print information.

3. The information processing apparatus according to claim 2, further comprising a number of print sheets setting unit which sets the number of print sheets for the print information as a print target when printing is designated to the printing unit.

4. The information processing apparatus according to claim 1, wherein the storage unit stores the print information as a target of two rounds of serial number processing in the past, in a series of serial number processing.

5. The information processing apparatus according to claim 4, wherein the storage unit stores the print information as a target of two rounds of serial number processing in the most recent past, in a series of serial number processing.

6. The information processing apparatus according to claim 4, wherein the storage unit stores the print information as a target of the serial number processing that was executed first and the print information as a target of the serial number processing that was executed last, in a series of serial number processing.

7. A control method for an information processing apparatus which processes print information including inputted serial number information and arbitrary information, the method comprising:
    carrying out serial number processing to update the serial number information in ascending order or in descending order;
    storing the print information as a target of the serial number processing;
    carrying out editing processing of the arbitrary information of the print information that is serial number-processed; and
    comparing at least two or more pieces of the print information that is stored, and displaying on a display unit the print information from which a part of the arbitrary information being determined to be different in the comparison of the at least two or more pieces of the print information is erased, at the time of displaying the print information after the serial number processing is executed twice or more for the editing processing.

8. The method according to claim 7, wherein the print information is stored as a target of two rounds of serial number processing in the past, in a series of serial number processing.

9. The method according to claim 8, wherein the print information is stored as a target of two rounds of serial number processing in the most recent past, in a series of serial number processing.

10. The method according to claim 8, wherein the print information is stored as a target of the serial number processing that was executed first and the print information as a target of the serial number processing that was executed last, in a series of serial number processing.

11. A computer program product for making a computer execute the steps of the method for an information processing apparatus according to claim 7.

12. A control method for an information processing apparatus which processes print information including serial number and arbitrary text inputted by an operation section, the serial number is designated to update whenever printing, the method comprising:
    storing the print information;
    printing the print information;
    updating the serial number in ascending order or in descending order after printing the print information;
    displaying the print information in which the serial number is updated;
    carrying out editing processing of the arbitrary text of the displayed print information in which the serial number is updated; and
    displaying the print information, which a different part of the arbitrary text is erased by comparing the at least two or more pieces of the print information that is stored, at the time of displaying the print information after the serial number is updated twice or more for the editing processing.

13. A computer program product for making a computer execute the steps of the method for an information processing apparatus according to claim 12.

* * * * *